(12) United States Patent
Sullivan

(10) Patent No.: US 10,578,443 B2
(45) Date of Patent: Mar. 3, 2020

(54) METHOD FOR RE-MAPPING SAFE AND TRAVERSABLE ROUTES

(71) Applicant: Nova Dynamics, LLC, Philomath, OR (US)

(72) Inventor: Joseph Sullivan, Philomath, OR (US)

(73) Assignee: Nova Dynamics, LLC, Philomath, OR (US)

( * ) Notice: Subject to any disclaimer, the term of this patent is extended or adjusted under 35 U.S.C. 154(b) by 0 days.

(21) Appl. No.: 15/361,042

(22) Filed: Nov. 24, 2016

(65) Prior Publication Data

US 2018/0328743 A1 Nov. 15, 2018
US 2019/0170518 A9 Jun. 6, 2019

Related U.S. Application Data

(60) Provisional application No. 62/259,152, filed on Nov. 24, 2015.

(51) Int. Cl.

| | |
|---|---|
| *G01C 21/32* | (2006.01) |
| *G01C 21/34* | (2006.01) |
| *B60W 50/14* | (2012.01) |
| *G05D 1/00* | (2006.01) |
| *G06Q 10/08* | (2012.01) |
| *G06K 9/00* | (2006.01) |
| *G05D 1/02* | (2006.01) |
| *G06F 16/29* | (2019.01) |

(52) U.S. Cl.
CPC .............. *G01C 21/32* (2013.01); *B60W 50/14* (2013.01); *G01C 21/3415* (2013.01); *G05D 1/0088* (2013.01); *G05D 1/0214* (2013.01); *G06F 16/29* (2019.01); *G06K 9/00805* (2013.01); *G06Q 10/083* (2013.01); *B60W 2050/143* (2013.01); *G05D 2201/0213* (2013.01)

(58) Field of Classification Search
CPC ........................................... G05B 2219/39212
See application file for complete search history.

(56) References Cited

U.S. PATENT DOCUMENTS

| | | |
|---|---|---|
| 5,058,024 A | 10/1991 | Inselberg |
| 5,559,511 A | 9/1996 | Ito et al. |
| 5,787,262 A | 7/1998 | Shakib |
| 5,806,074 A | 9/1998 | Souder et al. |
| 5,884,075 A | 3/1999 | Hester et al. |
| 5,889,953 A | 3/1999 | Thebaut et al. |

(Continued)

*Primary Examiner* — Daniel Swerdlow
(74) *Attorney, Agent, or Firm* — Dascenzo Intellectual Property Law, P.C.

(57) ABSTRACT

A method for manually or semi-manually re-mapping an urban environment during delivery operations by an autonomous vehicle is provided herein. In an embodiment of the invention, an autonomous delivery vehicle performs delivery operations within an urban environment. The urban environment can comprise a city or a portion of a city such as a neighborhood. The autonomous vehicle traverses along a previously mapped and scanned route that has been determined to be safe and traversable for the delivery vehicle. As it traverses the route, the delivery vehicle scans the route again using the same sensors that were used to scan the route initially. If a sensor delta is exceeded, the vehicle may execute any one or combination of notifying an operator, deciding, choosing a different route, continuing, or executing a contingency plan.

20 Claims, 5 Drawing Sheets

(56) References Cited

U.S. PATENT DOCUMENTS

| | | |
|---|---|---|
| 6,205,397 B1 | 3/2001 | Eslambolchi |
| 6,490,522 B2 | 12/2002 | Sugiyama |
| 7,076,409 B2 | 7/2006 | Agrawala |
| 7,430,261 B2 | 9/2008 | Forest et al. |
| 7,565,419 B1 | 7/2009 | Kwiatkowski |
| 8,718,861 B1 * | 5/2014 | Montemerlo ......... B60W 30/00 701/26 |
| 9,668,484 B2 | 6/2017 | Bristow |
| 2003/0220966 A1 | 11/2003 | Hepper et al. |

* cited by examiner

METHOD FOR RE-MAPPING SAFE AND TRAVERSABLE ROUTES

CROSS REFERENCES TO RELATED APPLICATIONS

This application claims priority to U.S. Provisional Patent Application Ser. No. 62/259,152 filed on Nov. 24, 2015 entitled "Product Delivery System and Apparatus", the disclosure of which is hereby incorporated by reference.

BACKGROUND OF THE INVENTION

The present invention relates generally to re-mapping a cargo delivery route, and more particularly to a method for re-mapping a safe and traversable route during delivery operations by an autonomous delivery vehicle.

BACKGROUND ART

Mobile robots are becoming more and more commonplace in society. It will be understood that these robots can be embodied in a variety of forms, such as in automated vacuum cleaners. A variety of applications can be found for mobile robots, such as, but not limited to, entertainment applications, such as toy robots, utility applications in environments that are unfriendly to humans, such as space, deep water, cold temperature, radiation, chemical exposure, biohazards, etc., dangerous tasks such as defusing of potential explosives, operation in confined spaces, such as collapsed buildings, the performance of menial tasks, such as cleaning, etc. Conventional robots that are mobile do not include automated localization and/or mapping functionality.

Localization techniques refer to processes by which a robot determines its position with respect to its surroundings. For example, in a "pure" localization system, the robot is provided with a map of its surroundings. Many environments are not static. For example, the rearranging of furniture in a room can render a preexisting map unusable. Thus, maps in pure localization systems are subject to relatively frequent and costly updates such that the map accurately represents its surroundings.

Mapping techniques relate to processes by which a robot builds a map of its surroundings. A robot that can autonomously build a map of its surroundings and can localize itself within the map can advantageously exhibit a relatively high degree of autonomy. Moreover, such a robot can advantageously adapt to changes in its surroundings. Navigation systems using position locating means associated with route position status are disclosed in U.S. Pat. No. 5,231,584 by Nimura et al, U.S. Pat. No. 5,262,775 by Tamai et al, and by U.S. Pat. No. 5,243,529 by Kashiwazaki. Nimura discloses a system for displaying a course guidance for a route between a departure point and a destination point from a map stored on a CD-ROM. Tamai discloses a system for displaying a message indicating a vehicle's deviation from a calculated optimal route and recomputing a new optimal route toward a destination. Navigation guidance information is displayed for the driver of the vehicle to use in following the new optimal route. Kashiwazaki discloses a system for displaying map information to aid a driver of a vehicle to reach a next schedule destination from a current location, according to a predefined schedule.

Because maps in pure localization systems are frequently made unusable, and because robots are capable of limited decision-making, it would be advantageous if a robot-based system for navigation autonomous route correction was derived.

Notification by exception is a well-known and accepted strategy for minimizing communication traffic between a central station and remote units. It would be an advantage to have a system to automatically notify the central station only when a significant deviation from expected norms were experienced by a delivery vehicle. Such as system would reduce human operator overhead thereby reducing operating costs.

The present invention remedies the shortcomings of the prior art by providing a method in which an autonomous delivery vehicle can make minor route-change decisions, but defers to a human operator when the route conditions are drastically altered.

BRIEF SUMMARY OF THE INVENTION

The present invention provides for manually or semi-manually re-mapping a route within an urban environment during delivery operations. In an embodiment of the invention, an autonomous delivery vehicle performs delivery operations within an urban environment. The urban environment can comprise a city or a portion of a city such as a neighborhood. The autonomous vehicle traverses along a previously mapped and scanned route that has been determined to be safe and traversable for the delivery vehicle. As it traverses the route, the delivery vehicle scans the route again using the same sensors that were used to scan the route initially. If a sensor delta is exceeded, the vehicle may execute any one or combination of notifying an operator, deciding, choosing a different route, continuing, or executing a contingency plan.

An embodiment of the present invention also provides for updating a memory containing a plurality of routes that are known to be safe and traversable. Whether the memory is updated depends on the nature and severity of the occurrence that caused the sensor delta to be exceeded. If the memory is updated, the update reflects a change in the route from an origin to a destination. Autonomous delivery vehicles that must deliver to the same destination from the same origin will be provided with the updated route to use during operation. The process of scanning for abnormalities along the route continues during future delivery operations.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the combination of all its structures for the functions specified.

Figure 1:
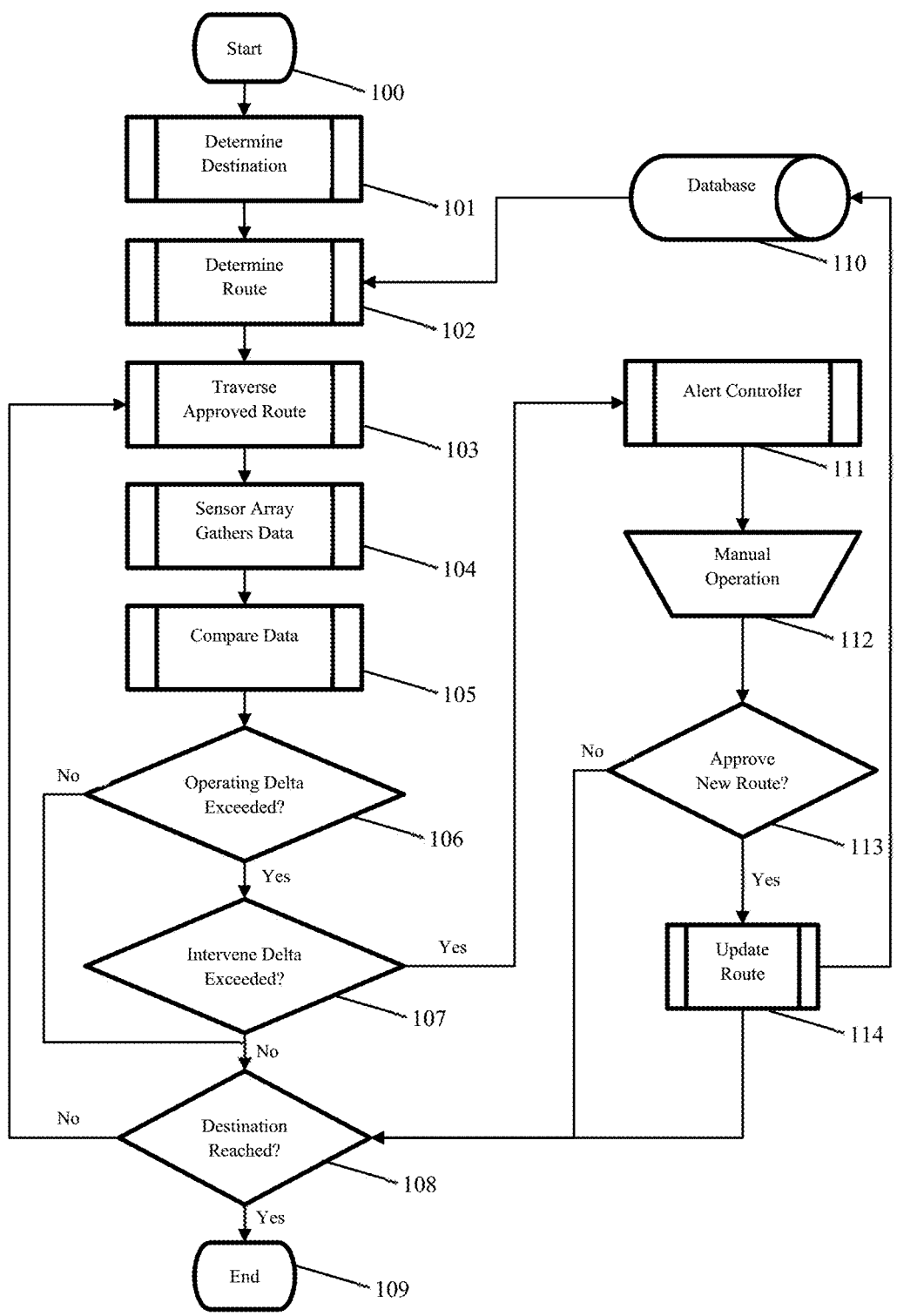
FIG. 1 is a flowchart showing the steps in a method for re-mapping a safe and traversable route during delivery operations as according to an embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a method for re-mapping a safe and traversable route during delivery operations. For the purpose of clarity, all like elements mentioned in this description will have the same designations. The terms "method for re-mapping a safe and traversable route during delivery operations", "re-mapping safe and traversable routes", "method", "invention", and "present invention" may be used interchangeably. The terms "autonomous delivery vehicle", "delivery vehicle", "vehicle", and "robot" may also be used interchangeably. In addition to the functions, features, components, and abilities of the invention already discussed in this specification, the invention may also have, but not be limited to, the following features contained within the description below.

It is important to note that throughout this Description, any references to data gathered from a sensor, sensor input, or data used to generate a delta can refer to an algorithm performed using data gathered from a sensor, or sensor synthesis. In some embodiments of the present invention, it is necessary to interpret, filter, or synthesize raw data to properly understand the meaning of the data. That is, one or more actions may be performed on sensor data before decisions regarding the data are made.

Referring now to FIG. 1, there is shown a flowchart displaying the steps in a method for re-mapping a safe and traversable route during delivery operations as according to an embodiment of the present invention. The method starts (100) when a delivery must be made. The destination to which the delivery must be made is determined (101). Determining the delivery destination (101) may occur by receiving a delivery address, a business name, a set of coordinates, or the like. The destination is within an urban area that has been previously mapped. An origin from which a route originates is also within the urban area. Prior to making the present delivery, the route from the origin to the delivery destination was previously mapped, scanned, and the route information stored in an electronic memory, such as a database (110), that is hosted on an electronic computing device. Scanning of the route was performed by using a sensor array containing a plurality of sensors. The sensors can include, but are not limited to, a Global Positioning System (GPS) sensor, radar, a visual recording device, an odometer, a laser sensor, and a sonar sensor. Scanned information is stored in the database (110) and can include not only the information from the sensor array, but additional information such as, but not limited to cardinal direction, turn directions, landmarks, terrain information, environment information, chronological information, and the like.

Route information that will allow a delivery vehicle to safely traverse from the origin to the destination is retrieved from the database (110) by executing a series of machine instructions that cause the electronic computing device hosting the database (110) to physically configure its memory components so that they enter a "read" mode and read the stored route information. The read stored route information is used by the delivery vehicle to make the delivery to the destination.

The delivery vehicle is an autonomous delivery vehicle, such as a robot, that receives the stored route information and uses the information to safely traverse from origin to destination (103). Routes retrieved from the database (110) are considered to be safe and traversable and are approved for use by delivery vehicles. In one or more examples, the robot is narrow enough to fit on a small crowded sidewalk and can operate in most conditions as a human delivery person would. In one or more examples, the paths along which the robot operates include sidewalks, ramps, driveways, crosswalks, and curbs.

During traversal of the route, the delivery vehicle scans the route again (104) using at least some of, if not all of, the same sensors that were used to generate the information stored in the database (110). The delivery vehicle carries with it a sensor array containing the sensors and uses the array to gather the new data (104).

The data gathered during the current traversal of the route is compared to the old data (105), the old data being the route information retrieved from the database (110) to determine a variance between the data gathered during the current traversal and the old data (105). As long as the comparison between the new and the old data, the newly gathered data from the sensor array and the data gathered previously by a similar sensor array, do not exceed an operating or an intervention delta (106, 107), then the delivery vehicle continues along the approved route (103) toward its destination.

While traversing its route, the delivery vehicle scans its immediate area using a sensor array. Data gathered from the array is compared against data (105) collected during a mapping phase of the route. During the mapping phase, some or all of the sensors presently on the automated delivery vehicle were used to build a profile of the route. The profile was stored to the database (110) after creation. The profile is retrieved from the database (110) and transferred to the delivery vehicle so that the delivery vehicle could make its delivery.

The scanned data is compared against the stored profile (105) while the vehicle traverses its route (103). The profile was initially created by scanning the route at least once and creating a maximum safe tolerance for the data collected by each sensor. In the present invention, if data collected from any of the individual sensors within the array during delivery operations exceeds the preset safe tolerance for that sensor, that sensors operating tolerance is exceeded (106). In some embodiments of the present invention, when any operating delta is exceeded the delivery vehicle enters an alert mode. In other embodiments of the present invention, it may be possible to exceed one or more operating deltas without entering the alert mode.

In the alert mode, the vehicle may choose to follow a contingency plan. The contingency plan contains instructions that inform the robot how best to proceed such as, but not limited to, reducing speed, crossing the street, taking an alternate route, remaining motionless, and the like. The contingency plan may be dynamic and call for the vehicle to make its own decision based on the sensor input. The contingency plan instructs autonomous delivery vehicle how to behave until the operating delta(s) return to normal. When the operating deltas return to normal, the alert mode is terminated.

When an operating delta is exceeded (106) a calculation is performed to determine whether an intervention delta is exceeded (107). The intervention delta is a value that, when exceeded, causes the delivery vehicle to alert a human controller (111). The intervention delta is contained within the route profile and retrieved from the database (110) prior to the vehicle traversing the route (103) to the destination. Data gathered from each sensor within the delivery vehicle's sensor array is compared against an intervention delta unique to that sensor. That is, a radar sensor may have a different intervention delta than a sonar sensor.

Once the human controller is alerted (111) the controller receives information regarding the circumstances or condition of the vehicle. A manual operation mode (112) may be entered where the controller manually assumes control of the vehicle operating it remotely. If the manual operation mode (112) is entered and the operator takes control, the operator may drive the vehicle until the hazard or obstacle that caused the intervention delta to be exceeded is avoided, or may take a different action as appropriate for the situation. The operator will attempt to avoid damage to the delivery vehicle, injury to people, or damage to objects in the vehicle's area. The operator will also attempt to complete the delivery if possible.

During manual operation (112) data gathered from the delivery vehicle's sensors (104) will be reviewed autonomously, semi-autonomously, or manually to decide whether to re-commit the newly gathered data to the database so that the route to that destination is altered (114), or so that operating or intervention delta is adjusted. Data from one or a plurality of the sensors may be reviewed and re-committed to the database as deemed appropriate for the situation.

Once the delivery vehicle's destination is reached (108) the method illustrated in this FIG. 1 ends (109).

Figure 2:
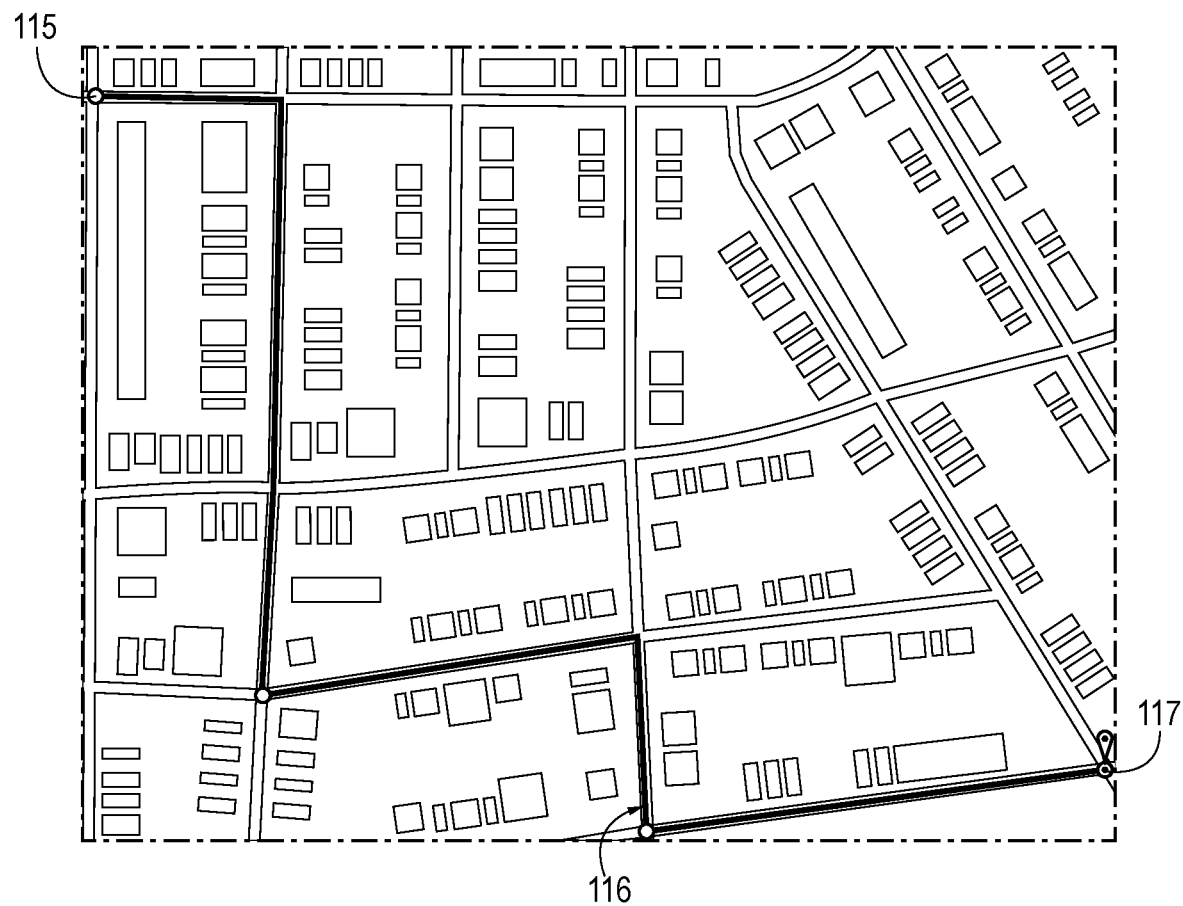
FIG. 2 is a map showing a safe and traversable route used during delivery operations as according to an embodiment of the present invention.

Referring now to FIG. 2, there is shown a map with a safe and traversable route (116) used during delivery operations as according to an embodiment of the present invention. An autonomous delivery vehicle will begin delivery operations by departing from an origin (115) and traversing along the route (116) to a destination (117). This route (116) was mapped and scanned prior to the delivery vehicle engaging in delivery operations. This route may also have been adjusted after a previous delivery attempt to the same destination (117) from the same origin (115) caused an intervention delta to be exceeded as illustrated in FIG. 1 (107). During manual operation of the delivery vehicle, data gathered by the vehicle may have been reviewed then recommitted to a database resulting in creation of the present route (116).

This process of re-scanning a route occurs and possibly re-mapping the route if unsafe conditions are met occurs during each delivery operation of the autonomous vehicle. New or previously undetected conditions may arise that require subsequent delivery attempts from the origin (115) to the destination (117) to take a new route. Thus, the path taken by delivery vehicles from the origin (115) to destination (117) is constantly under review for unsafe conditions. Unsafe conditions are any obstacles, features, terrain factors or the like that may cause damage to the delivery vehicle, injury to people, prevent delivery, or cause damage to something in the vehicle's environment. It should be noted that a route that is approved as safe and traversable from the origin (115) to the destination (117) may not be the fastest route.

Figure 3:
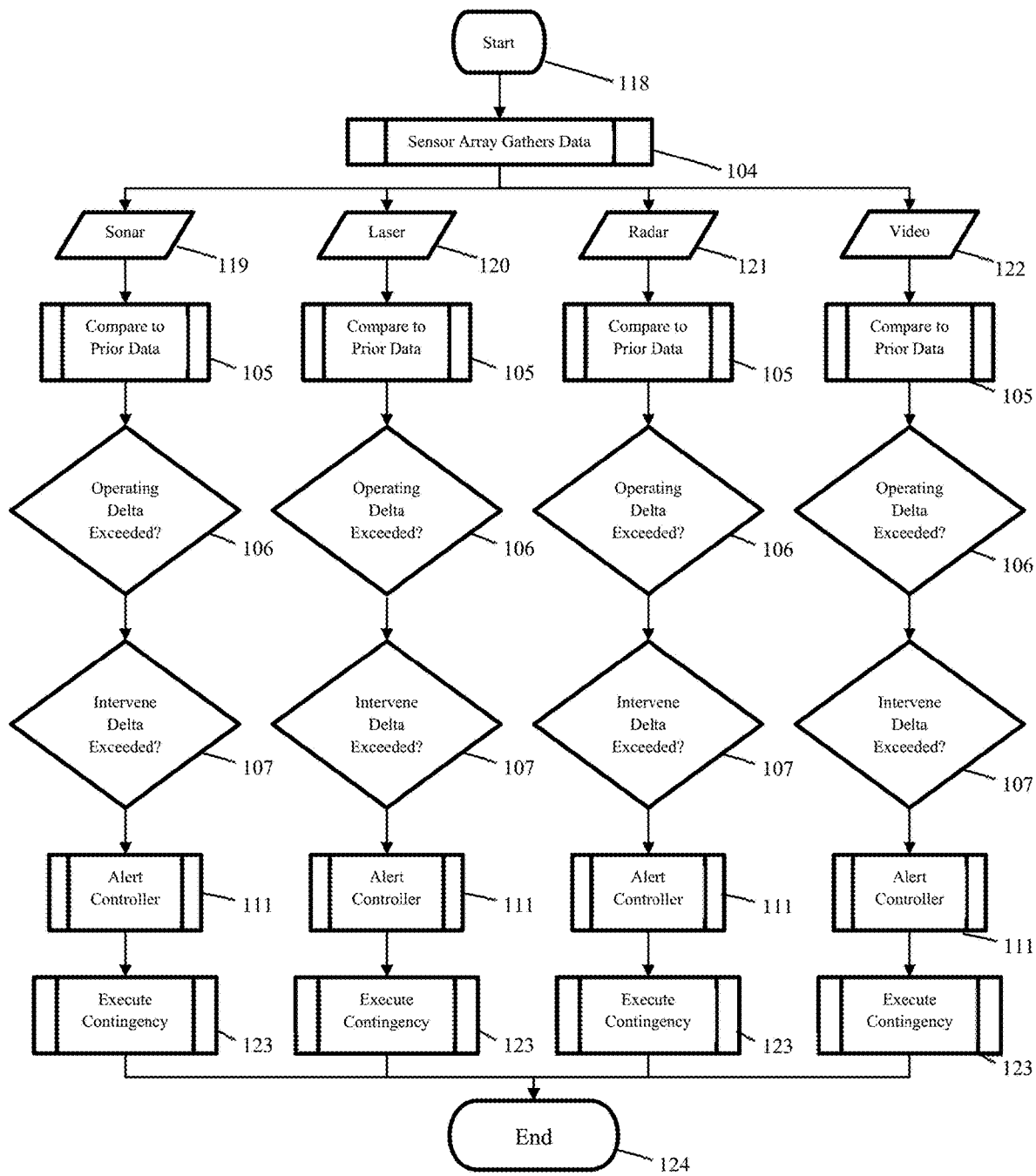
FIG. 3 is a flowchart showing the operating and intervention delta analysis procedure for each sensor in a sensor array as according to an embodiment of the present invention.

Referring now to FIG. 3, there is shown and operating and intervention delta analysis procedure for each sensor in a sensor array as according to an embodiment of the present invention. The illustrated procedure is a component of the present invention and is set forth in greater detail in this FIG. 3.

The procedure begins (118) when a sensor array (104) gathers data while an autonomous delivery vehicle is performing delivery operations. The sensor array (104) contains some or all of the same sensors what were used to map and scan the route that the delivery vehicle is presently traversing. In this embodiment of the present invention, a sonar device (119), a laser (120), a radar device (121) and a video recorder (122) comprise the sensors within the array. Data gathered from each sensor (119-122) is compared to data previously gathered (105) for that device. The previously data may have been generated during initial scanning of the route, or may have been generated during a previous delivery operation then saved when the route or operating deltas of the sensor array were updated.

If the comparison of the present device data to the prior data (105) results in an operating delta being exceeded (106), a second check is made to determine whether an intervention delta has also been exceeded (107). If either the operating delta or intervention delta is exceeded (106, 107), a plurality of actions may be taken by the autonomous vehicle or by controllers of the vehicle. The autonomous vehicle may execute a contingency plan, take an alternate route, notify a controller (111), decrease speed, or make its own decision on how to proceed. If the controller is notified (111), then the controller may take manual control of the vehicle. If the operating delta is exceeded (106), the autonomous vehicle may execute a contingency plan (123). The procedure ends when the intervention delta and the operation delta return to a normal operating range for each sensor (119-122).

It should be noted that independent comparisons are made, and if any of the sensors detect data that is not within a normal operating range then that sensor's operating or intervention delta may be exceeded (106-107). In an embodiment of the present invention, if data collected by the sonar device (119) exceed its operating delta (106), then the steps illustrated in components (107, 111, 123) are executed. In another embodiment of the present invention, if data gathered by the video recording device (122) exceed its operating delta (106) then the steps illustrated in components (107, 111, 123) are executed.

Figure 4:
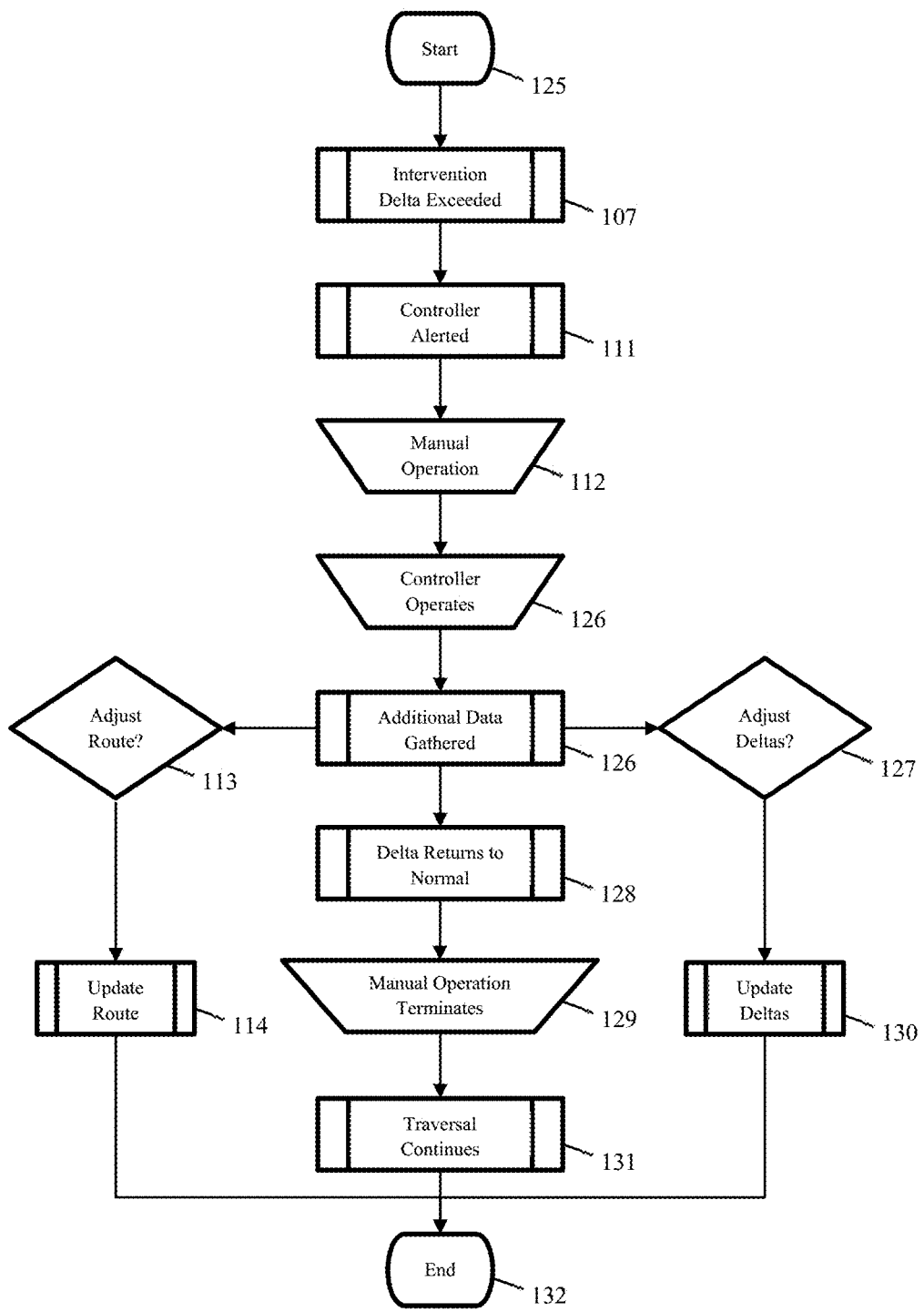
FIG. 4 is there is shown a flowchart with the steps taken if an intervention delta is exceeded during traversal of route during delivery operations by a delivery vehicle thereby resulting in re-mapping operations as according to an embodiment of the present invention.

Referring now to FIG. 4, there is shown a flowchart with the steps taken if an intervention delta is exceeded during traversal of route during delivery operations by a delivery vehicle thereby resulting in re-mapping operations as according to an embodiment of the present invention. The steps begin (125) when an intervention is exceeded (107) during autonomous vehicle delivery operations. An intervention delta is exceeded (107) generally when an occurrence of such a magnitude occurs that the autonomous delivery vehicle is incapable of resolving the situation without human intervention.

When the intervention delta is exceeded (107) the delivery vehicle transmits an alert to a controller (111). The controller is at a remote location such as the vehicle's origin or at a control center. The controller receives data from the autonomous vehicle which can include, but is not limited to, a live video feed, information from the vehicle's sensor array, GPS data, and the like. From the received information, the controller can decide whether to provide additional instructions to the autonomous vehicle so that the vehicle can resume delivery operations, whether the alert was a false alarm, or whether to place the vehicle in a manual operation (112) mode. If a manual operation mode (112) the controller remotely operates (126) the delivery vehicle in an effort to mitigate the dangerous or non-traversable conditions that gave rise to the exceedance of the intervention delta (107).

Before, during, and after the period when the controller is controlling (126) the vehicle, additional data is gathered (126) that will allow the controller, or another decision-making entity, to adjust the route (113) or update the intervention delta (127) so that the intervention delta will not be exceeded during future delivery operations. The decision to update the route (113) or adjust the deltas (127) may be made manually by a person reviewing the data, or semi-autonomously by a person with the aid of a computer-executed algorithm. The decision to adjust the route (113) or update the delta (127) if the person reviewing the data notices an occurrence that makes the route no longer safe or traversable. In an embodiment of the present invention, a person reviewing the data sees a "road closed" sign in video data retrieved from the vehicle. The person then decides to update the route (113) by choosing a different road for the vehicle to traverse.

The controller can continue to operate the vehicle (126) until the intervention deltas return to a normal operating range (128). That is, once data being gathered by one or more sensors in the vehicle's sensor array does not exceed an intervention threshold when compared against previously recorded data, the intervention delta is considered to have returned to normal (128). When the intervention delta returns to normal (128), manual operation of the delivery vehicle will terminate (129) and the vehicle will continue to traverse the route (131) until it reaches its destination. When the vehicle reaches its destination, the series of steps set forth in this FIG. 4 ends (132). Although not pictured, in some embodiments of the present invention manual operation (112) can continue even when the intervention delta returns to normal (128). In these embodiments, the controller may have decided continued manual operation was appropriate under the given situation.

If the route is adjusted (113), route information such as directions, GPS coordinates, the path to take, sensor information and the like is stored to an electronic memory so that delivery vehicles making deliveries to the same destination will utilize the updated route information. The re-scanning and potential updating of the route (114) is performed on every delivery operation so that changes in the environment can be identified and potential problems for future delivery vehicles avoided.

If the deltas are adjusted (127), sensor information such as data gathered by a laser sensor, a radar device, a sonar device, a video camera, a GPS sensor, or an odometer is analyzed and a revised safe operating threshold is determined for one or more of the vehicle's sensors. The updated safe operating threshold, the newly gathered data, or both, are stored in an electronic memory. Delivery vehicles traversing from the same origin to the new destination will use the updated sensor thresholds when determining if their intervention delta has been exceeded (107).

Figure 5:
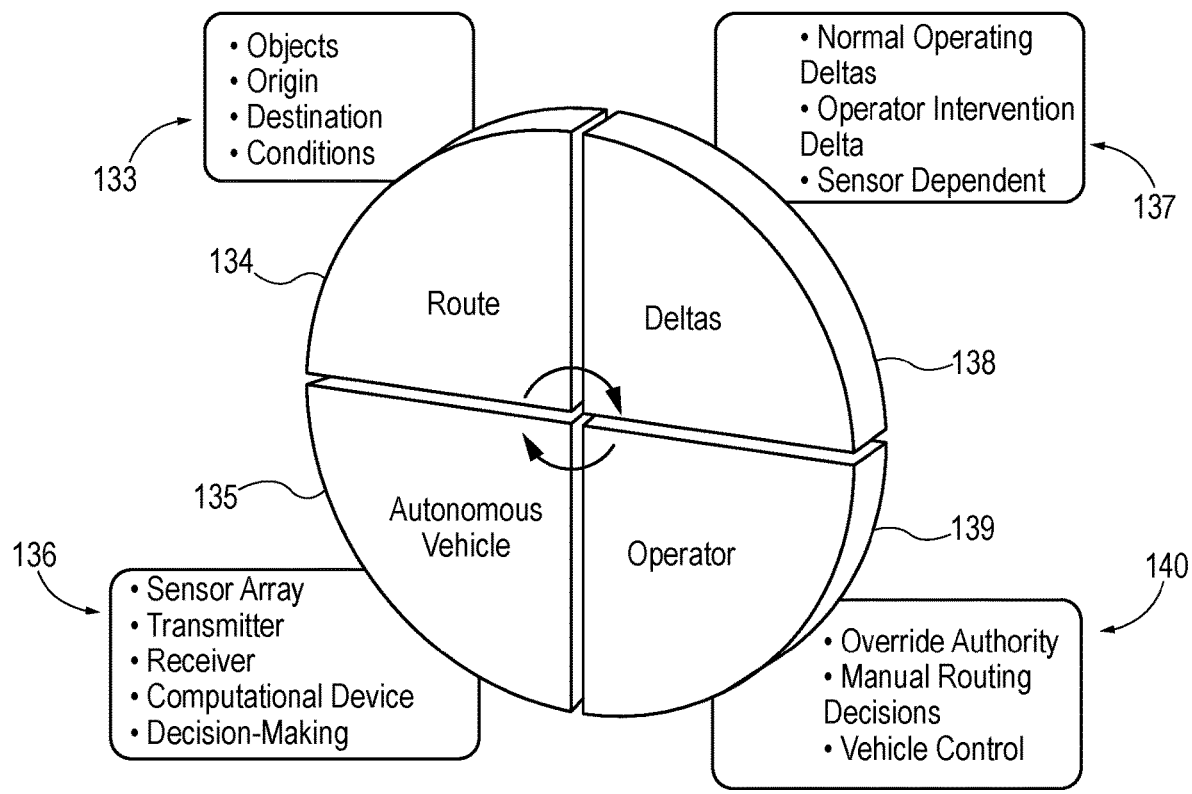
FIG. 5 is a diagram showing the primary components and exemplary attributes in a method for re-mapping a safe and traversable route during delivery operations as according to an embodiment of the present invention.

Referring now to FIG. 5, there is shown diagram setting forth the primary components and their exemplary attributes in a method for re-mapping a safe and traversable route during delivery operations as according to an embodiment of the present invention. One of the primary components is a route (134) that a delivery vehicle (135) uses to safely traverse from an origin to a delivery destination. (133). Along the route (134) the vehicle (135) may encounter a wide variety of objects (133) that were not present when the route (134) was initially scanned and safe operating thresholds for the route were determined. If the safe operating thresholds are exceeded, one or more deltas (138) are considered to be exceeded thereby necessitating that an action to be taken. The deltas (138) are unique to each sensor (137) that a vehicle (135) possesses. Exceeding the delta (138) may cause the vehicle (135) to enter an alert mode.

The presence of new and potentially dangerous objects in the route (134) may require an operator (139) to assume control of the vehicle (140). Such objects (133) can include, but are not limited to fallen trees, vehicles, pedestrians, potholes, aggressive animals, street closures, and trash or recycling cans. Similarly, changed conditions (133) such as inclement weather, snow, or ice may also necessitate the operator (139) to exercise their override authority (140) and take control of the vehicle (135).

If the objects or changed conditions do not require operator (139) intervention, the vehicle (135) will use an on-board computational device to make a decision (136) as to how best proceed. If the objects or changed conditions (133) require the vehicle (135) to contact the operator (139), the vehicle (135) will transmit an alert to the operator (139).

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for re-mapping a safe and traversable route during delivery operations. Further, since numerous modifications and changes will readily occur to those skilled in the art, it is not desired to limit the method for re-mapping a safe and traversable route during delivery operations to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. A method for responding to unsafe conditions detected by a robot delivery vehicle during delivery operations, the method comprising:

following a route profile by the robot delivery vehicle to traverse a route, wherein the route profile includes one or more old sensor data sets, each being unique in a sensor type, wherein each old sensor data set comprises information respective to a stored set of one or more objects contained within the route, wherein a preset operating delta and a preset intervention delta are associated with each old sensor data set, and wherein the sensor type is selected from a group consisting of a GPS sensor, a radar sensor, a visual recording device, a sonar sensor, and a laser sensor;

traversing the route by the robot delivery vehicle while gathering one or more new sensor data sets using one or more sensors of a sensor array included in the robot delivery vehicle, wherein each new sensor data set includes data from an individual sensor of the sensor array and comprises information respective to a detected set of one or more objects contained in the route, and wherein at least one sensor of the array is of the same sensor type as one of the old sensor data sets;

comparing by the robot delivery vehicle the new sensor data sets and the old sensor data sets of the same sensor type to determine a variance between the stored set of one or more objects and the detected set of one or more objects;

calculating by the robot delivery vehicle whether the variance exceeds the preset operating delta and calculating by the robot delivery vehicle whether the variance exceeds the preset operating delta and the preset intervention delta;

executing by the robot delivery vehicle a contingency plan when the robot delivery vehicle determines that the variance exceeds the preset operating delta and does not exceed the preset intervention delta, wherein the contingency plan includes one or more instructions for the robot delivery vehicle to execute until the variance does not exceed the preset operating delta; and causing the robot delivery vehicle to alert a human controller at a remote location when the robot delivery vehicle determines that the variance exceeds the preset operating delta and the preset intervention delta, and receiving commands remotely by the robot delivery vehicle from the human controller until the variance does not exceed the preset operating delta and the preset intervention delta.

2. The method of claim 1, wherein the one or more instructions include one or more of reducing speed, taking an alternate route, and remaining motionless.

3. The method of claim 1, wherein the variance is determined to exceed one or more of the preset operating delta and the preset intervention delta when an object of the detected set of one or more objects is not included in the stored set of one or more objects.

4. The method of claim 3, wherein the object of the detected set of one or more objects includes one or more of a fallen tree, a pedestrian, a pothole, an aggressive animal, a street closure, a trash can, a recycling can, snow, and ice.

5. The method of claim 1, further comprising reviewing by a human the one or more new sensor data sets that were gathered before, during, and after the intervention delta is exceeded; and determining by the human an occurrence that caused the intervention delta to be exceeded, wherein the occurrence is one of a non-traversable condition that is not represented in the route profile and a false alarm.

6. The method of claim 5, further comprising updating the route profile manually by the human to include the new sensor data representative of the non-traversable condition, and updating the route profile manually by the human to avoid the non-traversable condition when the human determines that the occurrence is caused by the non-traversable condition.

7. The method of claim 6, wherein the robot delivery vehicle is a first robot delivery vehicle, and wherein the updated route profile is to be used in the future by a second robot delivery vehicle when the second robot delivery vehicle traverses the route.

8. The method of claim 5, further comprising adjusting one or more of the preset operating delta and the preset intervention delta when the human determines that the occurrence is caused by the false alarm.

9. The method of claim 1, further comprising continuing to traverse the route by the robot delivery vehicle when the robot delivery vehicle determines that the variance does not exceed the operating delta.

10. The method of claim 1, wherein the robot delivery vehicle is a self-propelled vehicle configured to travel over one or more of sidewalks and crowded sidewalks.

11. A method for responding to unsafe conditions detected by a robot delivery vehicle during delivery operations, the method comprising:
following a route profile by the robot delivery vehicle to traverse a route, wherein the route profile comprises information respective to a stored set of one or more objects contained within the route, wherein a preset operating delta and a preset intervention delta are associated with the route profile;
traversing the route by the robot delivery vehicle while gathering one or more sensor data sets using one or more sensors of a sensor array included in the robot delivery vehicle, wherein each sensor data set includes data from an individual sensor of the sensor array and comprises information respective to a detected set of one or more objects contained in the route, wherein the detected set of one or more objects comprises a new route profile, and wherein each sensor of the array is of a sensor type selected from a group consisting of a GPS sensor, a radar sensor, a visual recording device, a sonar sensor, and a laser sensor;
comparing by the robot delivery vehicle the route profile and the new route profile to determine a variance between the stored set of one or more objects and the detected set of one or more objects;
calculating by the robot delivery vehicle whether the variance exceeds the operating delta;
calculating by the robot delivery vehicle whether the variance exceeds the intervention delta when the robot delivery vehicle determines that the operating delta is exceeded;
executing by the robot delivery vehicle a contingency plan when the robot delivery vehicle determines that the variance exceeds the operating delta and does not exceed the intervention delta, wherein the contingency plan includes one or more instructions for the robot delivery vehicle to execute;
causing the robot delivery vehicle to alert a human controller at a remote location when the robot delivery vehicle determines that the variance exceeds the intervention delta and the operating delta; and
continuing to traverse the route by the robot delivery vehicle when the robot delivery vehicle determines that the variance does not exceed the operating delta.

12. The method of claim 11, wherein the one or more instructions include one or more of reducing speed, taking an alternate route, and remaining motionless.

13. The method of claim 11, wherein the variance is determined to exceed one or more of the operating delta and the intervention delta when an object that is included in the new route profile is not included in the route profile.

14. The method of claim 13, wherein the object includes one or more of a fallen tree, a pedestrian, a pothole, an aggressive animal, a street closure, a trash can, a recycling can, snow, and ice.

15. The method of claim 11, further comprising reviewing by a human the one or more sensor data sets that were gathered before, during, and after the intervention delta is exceeded; and
determining by the human an occurrence that caused the intervention delta to be exceeded, wherein the occurrence is one of a non-traversable condition that is not represented in the route profile and a false alarm.

16. The method of claim 15, further comprising updating the route profile manually by the human to include the non-traversable condition represented in the new route profile, and updating the route profile manually by the human to avoid the non-traversable condition when the human determines that the occurrence is caused by the non-traversable condition.

17. The method of claim 15, further comprising adjusting one or more of the preset operating delta and the preset intervention delta when the human determines that the occurrence is caused by the false alarm.

18. The method of claim 11, wherein the route profile further includes additional navigation information, and wherein the additional navigation information includes one or more of cardinal directions, turn directions, landmarks, terrain information, environmental information, and chronological information.

19. The method of claim 17, wherein the robot delivery vehicle is a first robot delivery vehicle, and wherein the one or more of the adjusted preset operating delta and the adjusted preset intervention delta are to be used in the future by a second robot delivery vehicle when the second robot delivery vehicle traverses the route.

20. The method of claim 11, wherein the robot delivery vehicle is a self-propelled vehicle configured to travel over one or more of sidewalks and crowded sidewalks.

* * * * *

UNITED STATES PATENT AND TRADEMARK OFFICE
CERTIFICATE OF CORRECTION

PATENT NO. : 10,578,443 B2
APPLICATION NO. : 15/361042
DATED : March 3, 2020
INVENTOR(S) : Joseph Sullivan Page 1 of 1

It is certified that error appears in the above-identified patent and that said Letters Patent is hereby corrected as shown below:

In the Claims

Column 11, Line 3, after "intervention delta when the human" please delete "deter nines" and insert --determines--.

Signed and Sealed this
Fifth Day of May, 2020

Andrei Iancu
*Director of the United States Patent and Trademark Office*